(12) United States Patent
Elkhomri

(10) Patent No.: US 12,475,391 B2
(45) Date of Patent: Nov. 18, 2025

(54) METHOD AND SYSTEM FOR EVALUATION OF SYSTEM FAULTS AND FAILURES OF A GREEN ENERGY WELL SYSTEM USING PHYSICS AND MACHINE LEARNING MODELS

(71) Applicant: Banpu Innovation & Ventures LLC, Wilmington, DE (US)

(72) Inventor: Othman Elkhomri, Wilmington, DE (US)

(73) Assignee: Banpu Innovation & Ventures LLC, Wilmington, DE (US)

( * ) Notice: Subject to any disclaimer, the term of this patent is extended or adjusted under 35 U.S.C. 154(b) by 1042 days.

(21) Appl. No.: 17/454,663

(22) Filed: Nov. 12, 2021

(65) Prior Publication Data

US 2023/0153661 A1    May 18, 2023

(51) Int. Cl.
*G06N 7/01* (2023.01)
*E21B 47/07* (2012.01)
*E21B 47/10* (2012.01)

(52) U.S. Cl.
CPC .............. *G06N 7/01* (2023.01); *E21B 47/07* (2020.05); *E21B 47/10* (2013.01); *E21B 2200/20* (2020.05); *E21B 2200/22* (2020.05)

(58) Field of Classification Search
CPC ........... G06N 7/01; E21B 47/07; E21B 47/10; E21B 2200/20; E21B 2200/22
See application file for complete search history.

(56) References Cited

U.S. PATENT DOCUMENTS

| | | | |
|---|---|---|---|
| 2020/0284944 A1* | 9/2020 | Madasu | E21B 43/11 |
| 2021/0181374 A1* | 6/2021 | Sandnes | G06F 30/18 |
| 2021/0404314 A1* | 12/2021 | Filippov | E21B 44/00 |
| 2022/0108262 A1* | 4/2022 | Cella | G05B 17/02 |

* cited by examiner

*Primary Examiner* — John E Johansen
*Assistant Examiner* — Amir Elsayed Darwish
(74) *Attorney, Agent, or Firm* — Osha Bergman Watanabe & Burton LLP

(57) ABSTRACT

A method of managing a well system includes: obtaining, by a digital twin manager and based on field well dynamics behavior data of the well system, emulated well dynamics behavior data using a physics-based model; obtaining, based on a predetermined monitoring criterion, predicted well dynamics behavior data of the well system using a physics constrained machine learning model that is based on the emulated well dynamics behavior data and the field well dynamics behavior data; determining, using a second machine learning model, an impact level that associates the predicted well dynamics behavior data with a well system abnormality; determining, using the second machine learning model, a likelihood level that associates the predicted well dynamics behavior data with the well system abnormality; determining a probability and a risk level of the well system abnormality based on the impact level and the likelihood level.

11 Claims, 9 Drawing Sheets

METHOD AND SYSTEM FOR EVALUATION OF SYSTEM FAULTS AND FAILURES OF A GREEN ENERGY WELL SYSTEM USING PHYSICS AND MACHINE LEARNING MODELS

BACKGROUND

In the field of green energy generation, techniques for efficiently gathering natural resources are of great importance for maximizing production while minimizing environmental impact and risks. Well dynamics performance can be emulated with a good degree of accuracy for predictive maintenance purposes based on a physics-based model and a machine learning (ML) model in a digital twin for a field well system. As the number of well operations increases in the field well, risks associated with system faults and failures increase. In monitoring and predictive maintenance schemes, high efficiency and quality production systems are characterized by efficient detection and diagnosis of well system faults and failures. For example, detection of system faults and failures requires accurate signal and process mathematical models. As another example, diagnosis of system faults and failures is focused on systems theory and process modeling. It remains a difficult task to predict system faults and failures for monitoring and predictive maintenance for the field well of interest. The digital twin for the field well of interest may provide useful information of field well measurements to predict dynamics performance under normal operating conditions to enable normal and continuous operation. Thus, application of a digital twin provides an opportunity for early detection of system faults and failures for proactive monitoring and predictive maintenance for the field well system.

SUMMARY

In general, embodiments of the invention relate to a method of managing a well system including: obtaining, by a digital twin manager and based on field well dynamics behavior data of the well system, emulated well dynamics behavior data using a physics-based model; obtaining, by the digital twin manager and based on a predetermined monitoring criterion, predicted well dynamics behavior data of the well system using a physics constrained machine learning model that is based on the emulated well dynamics behavior data and the field well dynamics behavior data; determining, by the digital twin manager and using a second machine learning model, an impact level that associates the predicted well dynamics behavior data with a well system abnormality; determining, by the digital twin manager and using the second machine learning model, a likelihood level that associates the predicted well dynamics behavior data with the well system abnormality; determining, by the digital twin manager and using the second machine learning model, a probability and a risk level of the well system abnormality based on the impact level and the likelihood level; determining, by the digital twin manager, a command for a well operation based on the risk level and the probability of the well system abnormality; and transmitting, by the digital twin manager, the command to the well system.

In addition, embodiments of the invention relate to a well system including: a well site; a physics-based modeling server that outputs emulated well dynamics behavior data for the well site based on a physics-based model and field well dynamics behavior data of the well site; and a digital twin manager, coupled to the physics-based modeling server and the well site, that includes a processor. The digital twin manager: based on a predetermined monitoring criterion, predicted well dynamics behavior data of the well system using a physics constrained machine learning model that is based on the emulated well dynamics behavior data and the field well dynamics behavior data; determines, by using a second machine learning model, an impact level that associates the predicted well dynamics behavior data with a well system abnormality; determines, by using a second machine learning model, a likelihood level that associates the predicted well dynamics behavior data with the well system abnormality; determines, by using the second machine learning model, a probability and a risk level of the well system abnormality based on the impact level and the likelihood level; determines a command for a well operation based on the risk level and the probability of the well system abnormality; and transmits the command to the well system.

In addition, embodiments of the invention relate to non-transitory computer readable medium storing instructions executable by a computer processor, the instructions comprising functionality for: obtaining, based on field well dynamics behavior data of a well system, emulated well dynamics behavior data using a physics-based model; obtaining, based on a predetermined monitoring criterion, predicted well dynamics behavior data of the well system using a physics constrained machine learning model that is based on the emulated well dynamics behavior data determined and the field well dynamics behavior data; determining, by using a second machine learning model, an impact level that associates the predicted well dynamics behavior data with a well system abnormality; determining, by using the second machine learning model, a likelihood level that associates the predicted well dynamics behavior data with a well system abnormality; determining, by using the second machine learning model, a probability and a risk level of the well system abnormality based on the impact level and the likelihood level; determining a command for a well operation based on the risk level and the probability of the well system abnormality; and transmitting the command to the well system.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
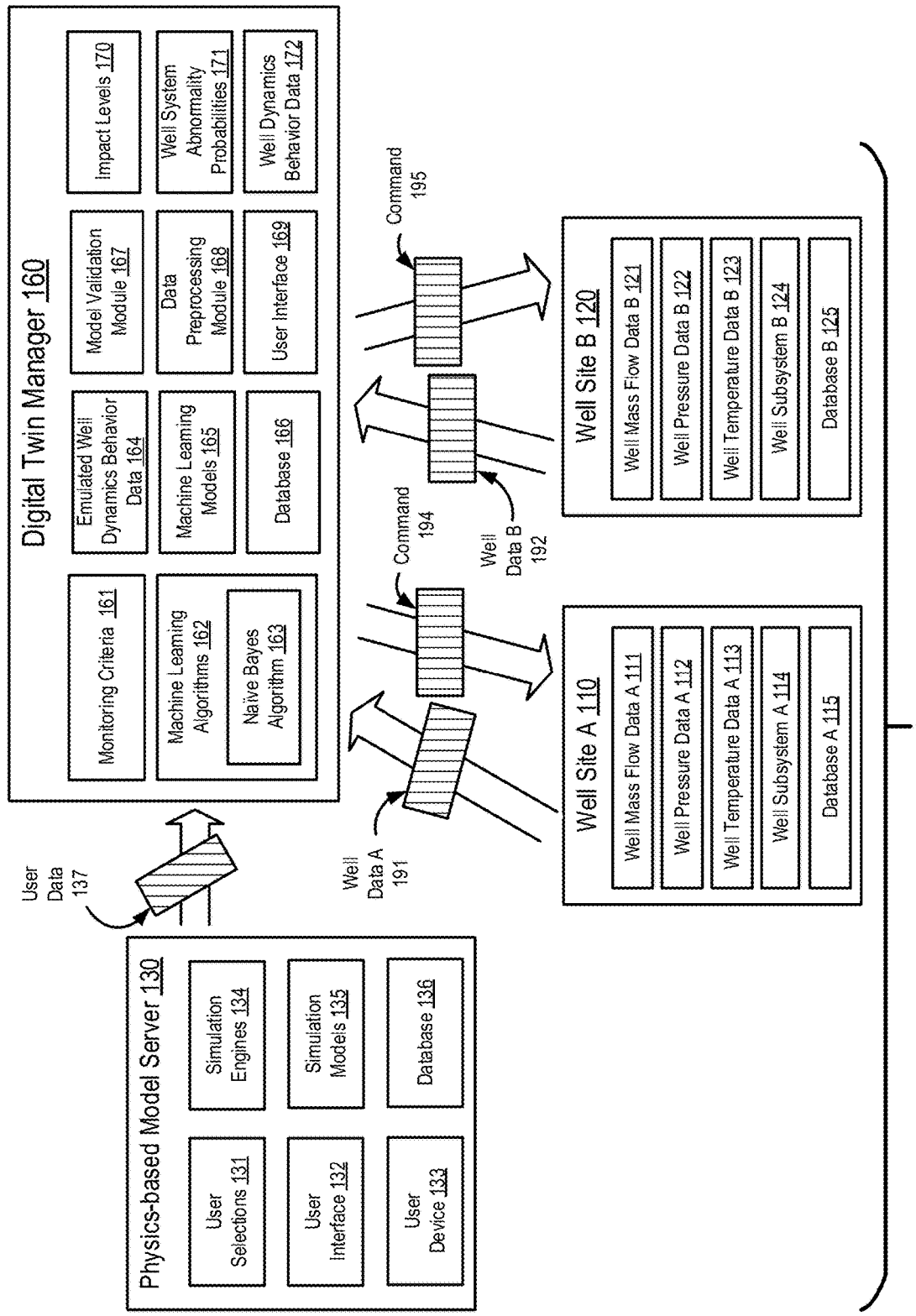
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

In general, embodiments of the disclosure include systems and methods for determining impact levels and likelihood levels regarding early detection of well system faults and failures (i.e., a well system abnormality) for a real well system using obtained field well dynamics behavior, predicted well dynamics behavior obtained by applying physics models and ML algorithms. For example, a digital twin of the well system of interest may apply a physics-based model and an artificial neural network (e.g., a Levenberg-Marquardt algorithm) in a physics constrained ML workflow to predict well dynamics behavior (e.g., mass flow, pressure, and temperature) under normal operations of the field well. Thus, the digital twin of the well system maybe used for monitoring and predictive maintenance purposes in important infrastructure systems (e.g., green energy generation infrastructure). As another example, different activities and/or performance over the life of a physical system (e.g., a well system) may result in abnormal well dynamics behavior associated with well system faults and failures (i.e., well system abnormalities). Likewise, different well dynamics behaviors may have different impact levels and likelihood levels associated with any particular well system abnormality. Thus, a ML algorithm (e.g., a Naïve Bayes algorithm) may determine an impact level and a likelihood level associated with a well system abnormality based on prior knowledge of well dynamics behavior data under normal operations. As a result, production facilities and well systems may be operated with higher efficacy for green energy generation, making decision-making efficient in the real-time operation of production facilities. For example, a digital twin may use the impact levels and the likelihood levels associated with a variety of different well system faults and failures to determine more accurate control information for preventing or anticipating abnormalities (e.g., maintenance periods may be predicted and scheduled based on identified declines or transient features in well mass flow performance; production equipment may be regulated to mitigate well system faults and failures or avoid costly emergency shut-down conditions).

Furthermore, the digital twin may be an integrated multi-physics, multi-scale, probabilistic simulation of an as-built system, enabled by digital thread, that uses the best available models, sensor information, and input data to emulate activities and/or performance over the life of a physical system (e.g., a well system). The well system may include one or more interconnected subsystems that include a compressor subsystem and a sales header subsystem. The digital twin of the well system of interest may be applied to generate one or more models to represent a well system and automatically emulate well dynamics behavior in the field of energy generation for monitoring and predictive maintenance purposes based on a physics-based model and a field well dynamics behavior of the well system of interest. For example, the digital twin for the well system of interest may apply the physics constrained ML workflow to reduce prediction error between the predicted well dynamics behavior and the obtained well dynamics behavior from the field well system of interest.

FIG. 1 shows a system in accordance with one or more embodiments. As shown in FIG. 1, a digital twin (100) for a well system of interest may include a digital twin manager (160), a well system comprising one or more well sites (e.g., well site A (110), well site B (120)), and/or various network elements (not shown). A well site (e.g., well site A (110), well site B (120)) may include a well subsystem (e.g., a compressor subsystem or a sales header subsystem). A well subsystem is described in further detail below with respect to FIG. 5 and the accompanying description. In some embodiments, the digital twin manager (160) obtains one or more types of well data (e.g., well data A (191), well data B (192)), such as well mass flow data (e.g., well mass flow data A (111), well mass flow data B (121)), well pressure data (e.g., well pressure data A (112), well pressure data B (122)), well temperature data (e.g., well temperature data A (113), well temperature data B (123)), one or more well subsystem data (e.g., data or parameters characterizing well subsystem A (114), well subsystem B (124)), and other well activities data stored in a database (e.g., database A (115), database B (125)). Likewise, the digital twin manager (160) may also obtain user data (137) (e.g., emulated well data from one or more physics-based model servers (130)). For example, well mass flow data A (111) may include measurements of mass flow (e.g., in kilogram/second (kg/s) or any other appropriate unit) for the well subsystem A (114). Well pressure data A (112) may include measurements of pressure (e.g., in Pascal (Pa) or any other appropriate unit) for one or more positions in the well subsystem A (114). Well temperature data A (113) may include measurements of temperature (e.g., in Fahrenheit degree (F)) for one or more positions in the well subsystem A (114). Emulated well mass flow, well pressure, and well temperature data included in the user data (137) may include measurements of mass flow in kg/s, pressure in Pa, and temperature in F for one or more well subsystems determined by a physics-based model server (130) for each well subsystem. As another example, each well subsystem may include information associated with a flow element and a flow meter based on the mass and/or volumetric flow rate, turn-down ratio (e.g., range of flow to be measured), pressure, temperature, and extent of flow surging. Likewise, each well subsystem may include various safety alerts, conditions at one or more wells (e.g., corresponding to system faults, system failures, system shut-downs, safety conditions, weather conditions, well conditions, etc.).

In some embodiments, a physics-based model server (130) may be a remote server that includes hardware and/or software with functionality for determining well dynamics behavior for a well system of interest. For example, the physics-based model server (130) may use one or more simulation engines (134) to apply one or more simulation models (135) to emulate well dynamics behavior data (e.g., mass flow, pressure, and/or temperature data) of a well subsystem and store the emulated well dynamics behavior data in a database (136) based on user selections (131) obtained from a user device (133) via a user interface (132) for a particular time period. For example, the user device (133) may include hardware and/or software to receive user selections (131) in real-time by interacting with a user via the user interface (132). Likewise, a remote server may be a server that communicates to various wells over a network or through a cloud computing environment. The well dynamics behavior data (e.g., well mass flow data A (111), well pressure data A (112), well temperature data A (113), well mass flow data B (121), well pressure data B (122), well temperature data B (123)) from the well subsystems may be automatically transmitted to the physics-based model server and stored in the database (136) (e.g., as field well dynamic behavior data).

Furthermore, the digital twin manager (160) may include hardware and/or software with functionality for obtaining a monitoring criterion (161) regarding digital twin activities, field well dynamics behavior data (e.g., well dynamics behavior data (172)), and emulated well dynamics behavior data (164) (e.g., the emulated well dynamics behavior data from the physics-based model server (130)) from data inputs (e.g., user data (137), well data A (191), well data B (192)). For example, the digital twin manager (160) acquires the monitoring criterion (161) by interacting with a user via a user interface (169). In particular, the monitoring criterion may include a threshold limiting the misfit function based on well dynamics behavior determined by a ML model (e.g., ML models (165)) and field well dynamics behavior obtained from one or more well subsystems. As another example, the digital twin manager (160) may allow the user to interact with a user device (133) to modify the monitor criterion (161) to verify the ML model (165) is designed as desired and that the performance of the digital twin (100) is set up for predicting well dynamics behavior to help to monitor the performance of one or more field well systems (e.g., well site A (110), well site B (120)). For example, when the misfit function is larger than the monitoring criterion (161) (e.g., a value of "50"), the ML model (165) is not desired and a new model may be developed. Thus, the user can modify the monitoring criterion (161) via the user interface (169) to adjust the ML model (165) and/or the physics-based model (e.g., simulation models (135)) to improve the performance of the digital twin (100) of the well system.

Keeping with FIG. 1, in some embodiments, the digital twin manager (160) may include hardware and/or software with functionality for determining a predicted well dynamics behavior using a ML algorithm (162) based on the emulated well dynamics behavior data (e.g., emulated well dynamics behavior data (164)) obtained from the physics-based model server (130) and obtained well dynamics behavior data (172) (i.e., field well dynamics behavior data) from the well system (e.g., well mass flow data A (111), well pressure data A (112), well temperature data A (113), well mass flow data B (121), well pressure data B (122), well temperature data B (123)).

Furthermore, the digital twin manager (160) may include hardware and/or software with functionality for determining impact levels (170) and well system abnormality probabilities (171) using a ML algorithm (162) (e.g., a Naïve Bayes algorithm (163)) based on predicted well dynamics behavior and obtained well dynamics behavior data (172) from the well system. For example, the digital twin manager (160) may assign an impact level (e.g., one of the impact levels (170)) and/or a likelihood level of well system faults and failures (e.g., one of the well system abnormality probabilities (171)) based on prior experience or user defined parameters via a user interface (169). In regard to impact levels, an impact level may be a weight value for an attribute (e.g., mass flow, pressure, and/or temperature data) used to determine the amount of risk that the well system may experience an abnormality (e.g., a fault and/or failure). In particular, an attribute may have a high impact level (e.g., a value of "0.5"), indicating the attribute is associated with a potential well system abnormality when the attribute has a value beyond the normal range defined by a user or prior experience. Likewise, an attribute may have a low impact level (e.g., a value of "0.01"), indicating the attribute is not associated with a potential well system abnormality when the attribute has a value beyond the normal range defined by a user or prior experience.

With regard to well system abnormality probabilities (171), the digital twin manager (160) may determine a likelihood value for an attribute (e.g., mass flow, pressure, and/or temperature data) regarding the possibility associated with a well system fault or failure. For example, a well system with one or more known well system abnormality vulnerabilities may have a high probability of being compromised than another well system with no known well system abnormality vulnerabilities (e.g., because of regular facility monitoring maintenance and through security protocols).

In some embodiments, the digital twin manager (160) transmits a command (e.g., command (194), command (195)) to a well site (e.g., well site A (110), well site B (120), respectively) to perform one or more well operations to control well activities (e.g., to control well subsystem A (114), well subsystem B (124) and affect well mass flow data A (111), well pressure data A (112), well pressure data B (122), well mass flow data B (121), well temperature data A (113), well temperature data B (123)), and other well activities data stored in a database (e.g., database A (115), database B (125)) for the well system. For example, a digital twin manager (160) may implement a ML model (165) to predict well mass flow stored in a database (166) based on the emulated well dynamics behavior data from the physics-based model server (130) (e.g., emulated well dynamics behavior data (164)) and well dynamics behavior data (172) from one or more wells to tune a particular monitoring criterion (161) for the well system. Alternatively, the command may be instructions for maintaining current operating conditions and well activities. Thus, different inputs (e.g., types of data or different data sources) may provide the initial setup of a particular monitoring criterion.

Furthermore, the data inputs may be customized by a data preprocessing module (168) according to different physics-based models to better arrange a monitoring criterion. For example, the data preprocessing module (168) may normalize the data inputs by subtracting mean value and scaling the data inputs by standard deviation. As another example, the data preprocessing module (168) may apply a filter to remove high-frequency components (e.g., sensor's noise) that cannot be emulated by ML algorithms (162). In particular, the data preprocessing module (168) may apply a filter to decompose the data inputs into one or more narrow frequency bands. A filter may be a Butterworth filter, a Chebyshev filter, a Gaussian filter, a Bessel filter, an Elliptic filter, or a raised-cosine filter. Likewise, the data preprocessing module (168) may merge one or more narrow frequency band data outputs to single broadband data outputs by a straight or weighted summation in time or frequency domain. Since the digital twin manager (160) is self-maintained on data storage and usage for monitoring and predictive maintenance purposes, the digital twin manager (160) may require minimal supervision or human interaction.

In some embodiments, the digital twin manager (160) advises a user about a regular structure of setting a well monitoring criterion when the learning process detects a feature that a human might miss due to the complexity and amount of data and variables. For example, an advisement may be a message prompt in a graphical user interface (e.g., user interface (169)) managed by the digital twin manager (160).

In some embodiments, the digital twin manager (160) may solves a least-squares curve fitting problem which has a misfit function which includes a well dynamics behavior prediction error (e.g., integral square error (ISE), mean error (ME), normalized ISE, and normalized ME) based on the difference between predicted well dynamics behavior obtained using a physics constrained ML model and acquired well dynamics behavior from the well system of interest.

In some embodiments, for example, the digital twin manager (160) applies one or more ML algorithms (162) (e.g., an artificial neural network, a Levenberg-Marquardt algorithm) to train a ML model (165) (i.e., a physics constrained machine learning model) to determine well dynamics behavior at a well (e.g., well site A (110), well site B (120)). Likewise, the digital twin manager (160) includes a model validation module (167) to validate the ML model (165). In some embodiments, a digital twin manager (160) may generate augmented or synthetic data to produce a large amount of interpreted data for training a particular model. Likewise, a ML model (165) may be trained using one or more ML algorithms (162).

In some embodiments, a ML model (165) may be trained by using a backpropagation algorithm (e.g., an artificial neural network) to train a neural network. A neural network may include one or more hidden layers, where a hidden layer includes one or more neurons. A neuron may be a modelling node or object that is loosely patterned on a neuron of the human brain. In particular, a neuron may combine data inputs with a set of coefficients (i.e., a set of network weights and biases for adjusting the data inputs). These network weights may amplify or reduce the value of a particular data input, thereby assigning an amount of significance to various data inputs for a task being modeled. These network biases may add a constant (e.g., a given bias) to a particular data input, thereby shifting the activation function for a task being modeled. Through machine learning, a neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

As another example, in some embodiments, a ML model (165) may be trained by an artificial neural network which applies a Levenberg-Marquardt algorithm. The training data may include historical events obtained from a physics-based model server (130) and well data (e.g., well data A (191), well data B (192)) from a well system of interest. A digital twin manager (160) may continue to train the ML model (165) by adjusting the physics-based model server (130) to more accurately model the emulated well dynamics behavior data (164). Thus, the ML model (165) predicts the well dynamics behavior of the well system of interest because the learning process of the algorithm is setup for monitoring and predictive maintenance purposes as desired. In particular, the Levenberg-Marquardt algorithm interpolates between a Gauss-Newton algorithm and a steepest descend algorithm. The Levenberg-Marquardt algorithm applies a steepest descend algorithm when the misfit function is complex for a model at an iteration and approximately performs a Gauss-Newton algorithm when the misfit function for a model at an iteration is close to a quadratic approximation.

Furthermore, the digital twin manager (160) may apply an artificial neural network within a digital twin of the well system of interest. For example, the artificial neural network may determine one or more weights of an artificial neural network based on a probabilistic nature, allowing the network to automatically and optimally penalize excessively complex models. In particular, the artificial neural network converts a non-linear regression into a well-posed statistical problem based on ridge regression which has considerably smaller than the number of weights in a fully connected back-propagation neural network. The artificial neural network updates weights and biases according to Levenberg-Marquardt optimization to minimize a combination of squared errors and weights and then determine combination for a generalized model. Thus, the artificial neural network may reduce or eliminate the need for lengthy cross-validation. Likewise, the artificial neural network may improve effectiveness, generalization, and prediction quality of the ML model and reduce the potential for overfitting and overtraining of the ML model.

Furthermore, the digital twin manager (160) may use a Levenberg-Marquardt algorithm to solve non-linear least-squares curve fitting problem to minimize the misfit function based on the difference between the emulated well dynamics behavior obtained using a physics-based model and the field well dynamics behavior from the well system of interest. The Levenberg-Marquardt algorithm is a combination of the steepest descent method and the Gauss-Newton method. In the steepest descent method, the misfit function is minimized by seeking a solution in the steepest descent direction. In the Gauss-Newton method, the misfit function is minimized by seeking a solution assuming the misfit function is locally quadratic. For example, the Levenberg-Marquardt algorithm is more like a steepest descent method when the model is far from the optimal model and the misfit function is complex with many local minimums. On the other hand, the Levenberg-Marquardt algorithm is more like a Gauss-Newton method to speed up convergence when the model is close to the optimal model and the misfit function is close a quadratic approximation.

Figure 2:
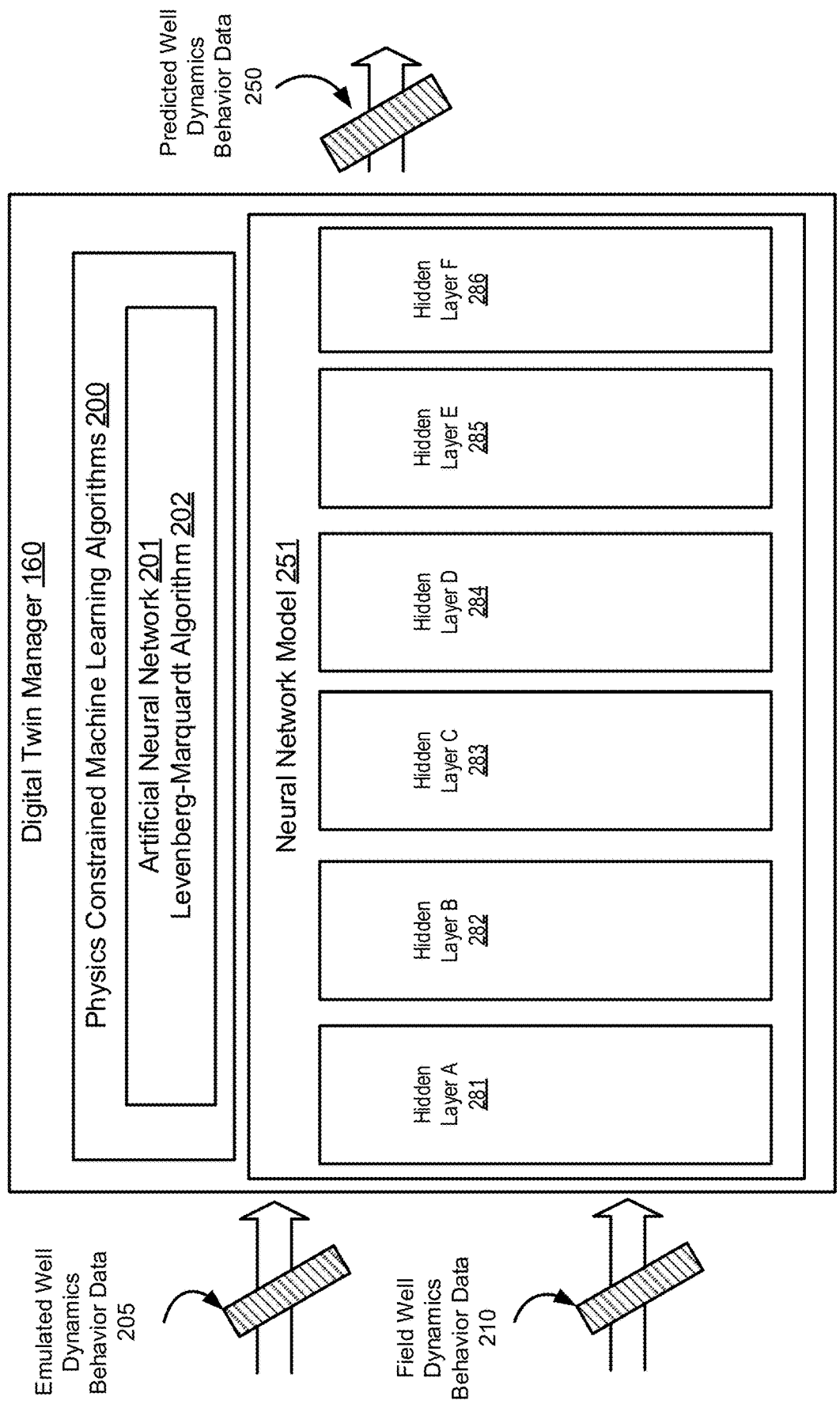
FIG. 2 shows an example in accordance with one or more embodiments.

FIG. 2 shows an example of generating a model to determine predicted well dynamics behavior data (250) based on the emulated well dynamics behavior data (205) (i.e., an emulated well dynamics behavior data for the well system) determined by a physics-based model and the field well dynamics behavior data (210) obtained from a well system of interest in accordance with one or more embodiments. The following example is for explanatory purposes only and not intended to limit the scope of the disclosed technology.

In FIG. 2, a neural network model (251) is trained using one or more physics constrained ML algorithms (200) for predicting well dynamics behavior data (250). The physics constrained ML algorithms (200) include an artificial neural network (201) and a Levenberg-Marquardt algorithm (202). The neural network model (251) obtains emulated well dynamics behavior data (205) based on a physics-based model and field well dynamics behavior data (210) acquired from a well system to determine the predicted outputs represented by the output layer consisting of predicted well dynamics behavior data (250). The input parameters (e.g., emulated well dynamics behavior data (205), field well dynamics behavior data (210)) are synchronized and pre-processed with a quality control operation (e.g., by the data preprocessing module (168) of the digital twin manager (160)). The predicted well dynamics behavior data (250) may have higher time resolution than the field well dynamics behavior data (210) and may capture broadband dynamics behavior of the well system or an individual well subsystem.

Furthermore, the neural network model (251) may include six hidden layers (i.e., hidden layer A (281), hidden layer B (282), hidden layer C (283), hidden layer D (284), hidden layer E (285), hidden layer F (286)), which may be a convolutional layer, a pooling layer, a rectified linear unit (ReLU) layer, a softmax layer, a regressor layer, a dropout layer, and/or various other hidden layer types. In some embodiments, the number of hidden layers may be greater than or less than six. These hidden layers can be arranged in any order as long as they satisfy the input/output size criteria. Each layer comprises of a set number of image filters. The output of filters from each layer is stacked together in the third dimension. This filter response stack then serves as the input to the next layer(s). Furthermore, each hidden layer may be featured by 20 neurons or any appropriate number of neurons.

In some embodiments, the hidden layers are configured as follows. The hidden layer A (281) and the hidden layer B (282) may be down-sampling blocks to extract high-level features from the input data set. The hidden layer D (284) and the hidden layer E (285) may be up-sampling blocks to output the classified or predicted output data set. The hidden layer C (283) may perform residual stacking as bottleneck between down-sampling blocks (e.g., hidden layer A (281), hidden layer B (282)) and up-sampling blocks (e.g., hidden layer D (284), hidden layer E (285)). The hidden layer F (286) may include a softmax layer or a regressor layer to classify or predict a predetermined class or a value based on input attributes.

In a convolutional layer, the input data set is convolved with a set of learned filters that are designed to highlight specific characteristics of the input data set. A pooling layer produces a scaled down version of the output by considering small neighborhood regions and applying a desired operation filter (e.g. min, max, mean, etc.) across the neighborhood. A ReLU layer enhances a nonlinear property of the network by introducing a non-saturating activation function. One example of such a non-saturating function is to threshold out negative responses (i.e., set negative values to zero). A fully connected layer provides a high-level reasoning by connecting each node in the layer to all activation nodes in the previous layer. A softmax layer maps the inputs from the previous layer into a value between 0 and 1 or between $-1$ and 1. Therefore, a softmax layer allows for interpreting the outputs as probabilities and selection of classified facie with highest probability. In particular, a softmax layer may apply a symmetric sigmoid transfer function to each element of the raw outputs independently to interpret the outputs as probabilities in the range of values between $-1$ and 1. A dropout layer offers a regularization technique for reducing network over-fitting on the training data by dropping out individual nodes with a certain probability. A loss layer (e.g., utilized in training) defines a weight dependent cost function that needs to be optimized (i.e., bring the cost down toward zero) for improved accuracy.

In some embodiments, each hidden layer is a combination of a convolutional layer, a pooling layer, and a ReLU layer in a multilayer architecture. For example, each hidden layer (e.g., hidden layer A (281), hidden layer B (282), hidden layer C (283), hidden layer D (284), hidden layer E (285), hidden layer F (286)) has a convolutional layer, a pooling layer, and a ReLU layer.

Furthermore, the physics constrained ML algorithms (200) may include an activation function in a ReLU layer (e.g., hidden layer F (286)) to calculate the misfit function based on the difference between the predicted well dynamics behavior data (250) and a ground truth (e.g., field well dynamics behavior data (210) obtained from the well system). In some embodiments, a physics constrained ML algorithm (200) may use a simple data split technique to separate the input dynamics behavior data (e.g., emulated well dynamics behavior data (205) and field well dynamics behavior data (210)) used for the training, validation, and testing of the physics constrained ML models. An example, the data split technique may consider 70% of the obtained well dynamics behavior data for model training (e.g., tuning of the model parameters), 15% of the obtained well dynamics behavior data for validation (e.g., performance validation for each different set of model parameters), and 15% of the obtained well dynamics behavior data for testing the final trained model. However, the data split technique may be appropriately adjusted (e.g., by the user) to prevent over-fitting that results in physics constrained ML models with limited generalization capabilities (e.g., models that under-perform when predicting unseen sample data).

Furthermore, the physics constrained ML algorithms (200) may apply a nested k-fold inner/outer cross-validation to tune and validate the optimal parameters of the ML model. In one or more embodiments, the nested stratified inner/outer cross-validation may be a software and/or hardware system that includes functionality to mitigate the over-fitting problem of the ML model by applying a k-fold inner cross-validation and a k-fold outer cross-validation. The k-fold inner cross-validation and the k-fold outer cross-validation may have different values of the "k" parameter. In some example embodiments, the nested inner/outer cross-validation defines one or more physics constrained ML algorithms and their corresponding models in a grid and evaluates one or more performance metrics of interest (e.g., area under curve (AUC), accuracy, geometric mean, f1 score, mean absolute error, mean squared error, sensitivity, specificity, etc.) to find the optimal parameters of the physics constrained ML model.

Figure 3:
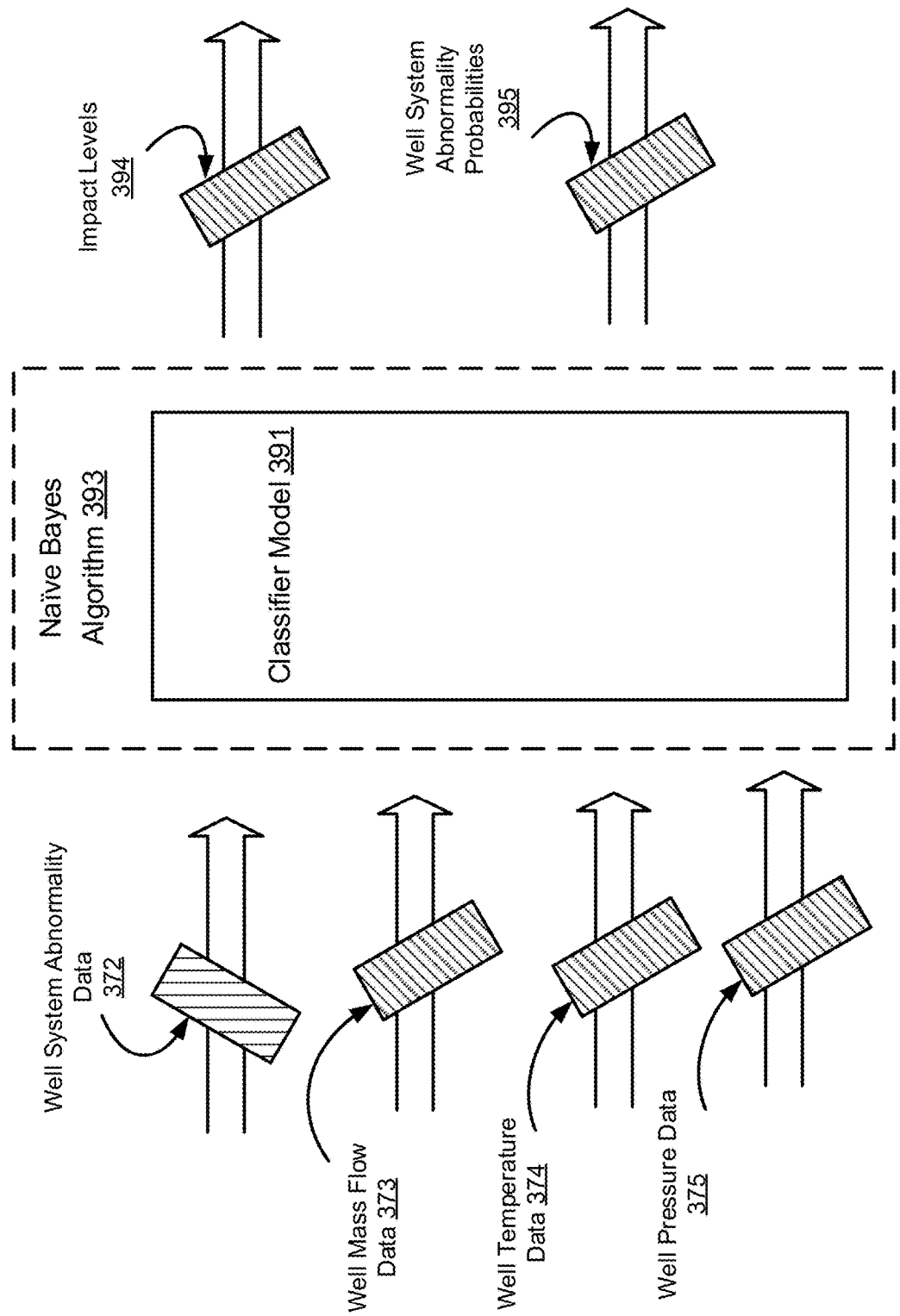
FIG. 3 shows an example in accordance with one or more embodiments.

FIG. 3 provides an example of generating a model to predict impact levels (394) and well system abnormality probabilities (395) in accordance with one or more embodiments. The following example is for explanatory purposes only and not intended to limit the scope of the disclosed technology. In FIG. 3, a model ((e.g., a classifier model (391)) is trained using a Naïve Bayes algorithm (393) for predicting impact levels (394) and well system abnormality probabilities (395)). For example, the Naïve Bayes algorithm (393) may comprise attributes, class probabilities, and conditional probabilities based on the predicted well dynamics behavior data and the abnormal operational data. In particular, the classifier model (391) obtains four inputs for training, i.e., well system abnormality data (372), well mass flow data (373), well temperature data (374), and well pressure data (375). Well system abnormality data (372) may be well dynamics behavior data (e.g., mass flow, pressure, and temperature) saved in the database (166) to characterize well performance when the well system is not under normal operations (i.e., abnormal operational conditions). For example, well system abnormality data (372) may be the value range of well mass flow when the well system is not under normal operations (e.g., corresponding to system faults, system failures, system shut-downs, safety conditions, weather conditions, well conditions, etc.). The Naïve Bayes algorithm (393) is based on the Bayer's theorem which describes the posterior probability in a well system from the well system abnormality probabilities (171) of an evidence which can often be determined from experimental knowledge based on equation 1:

$$P(H|E)=P(E|H)*P(H)/P(E) \quad \text{Equation 1}$$

Where P(H|E) is the posterior probability of hypothesis H given the evidence E, P(E) is the probability of the evidence E regardless of the hypothesis, P(H) is the prior probability of the hypothesis H being true regardless of the evidence, and P(EH) is the probability of evidence E given that the hypothesis H was true. According to one or more embodiments, the Bayer's theorem may be used in the chain rule to determine the posterior probability in a well system from the probabilities of multiple pieces of evidence.

Furthermore, a Naïve Bayes algorithm may determine impact levels (170, 394) from one or more data inputs (e.g., well system abnormality data (372), well mass flow data (373), well temperature data (374), and well pressure data (375)). According to one or more embodiments, a Naïve Bayes algorithm may determine the posterior probability (e.g., well system abnormality probabilities (171, 395)) from one or more data inputs (e.g., well system abnormality data (372), well mass flow data (373), well temperature data (374), and well pressure data (375)).

While FIGS. 1, 2, and 3 show various configurations of components, other configurations may be used without departing from the scope of the disclosure. For example, one or more of the individual components shown in FIGS. 1, 2, and 3 may be omitted, repeated, and/or disposed in a location different than that shown in FIGS. 1, 2, and 3. Accordingly, the scope of the invention should not be limited by the specific arrangement as depicted in FIGS. 1, 2, and 3.

Figure 4:
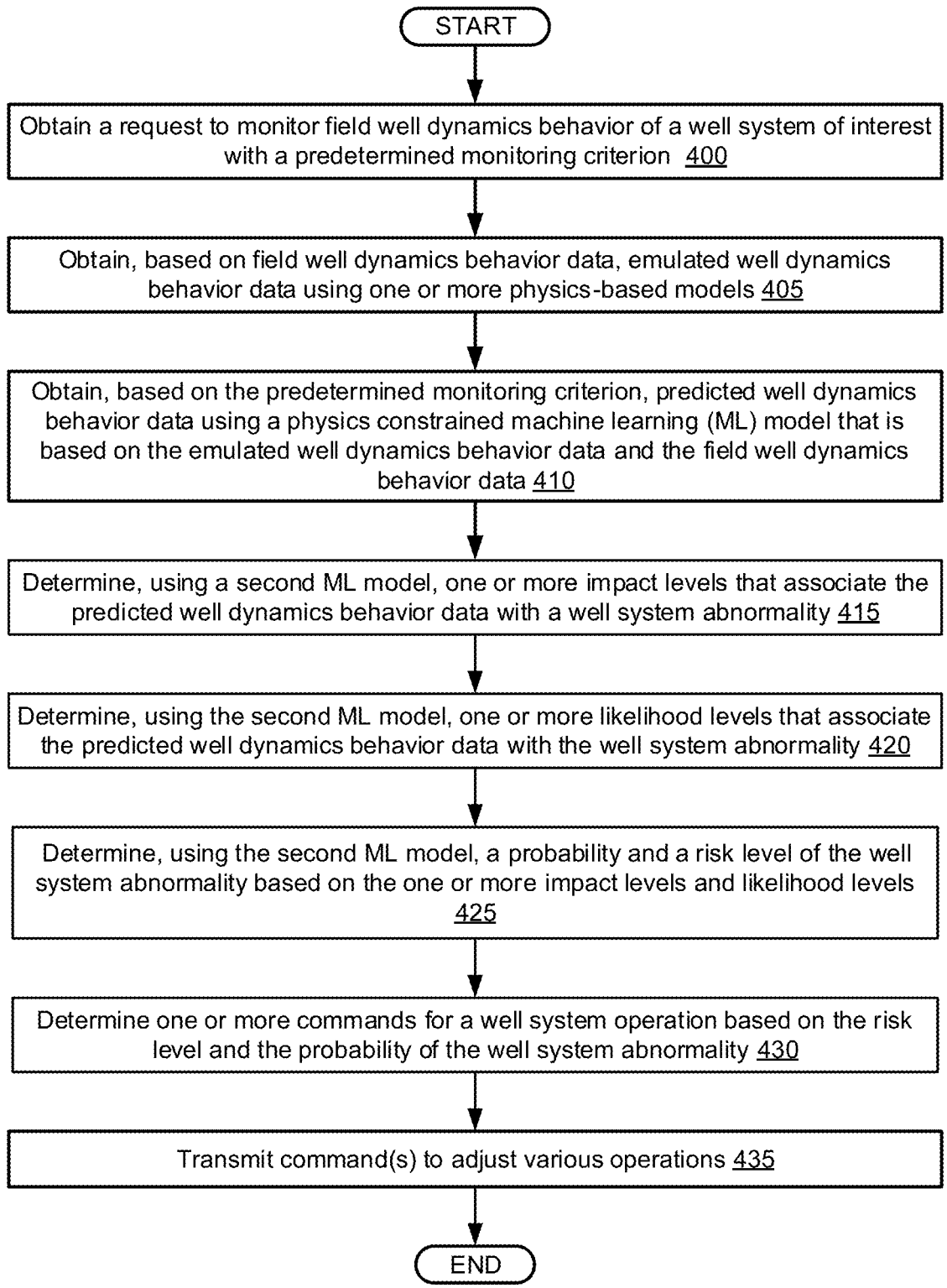
FIG. 4 shows a flowchart in accordance with one or more embodiments.

FIG. 4 shows a flowchart in accordance with one or more embodiments. Specifically, FIG. 4 describes a general method for determining an impact level and a likelihood level regarding early detection of a system abnormality for a digital twin of a well system in accordance with one or more embodiments. One or more blocks in FIG. 4 may be performed by one or more components (e.g., digital twin manager (160)) as described in FIGS. 1 and 2. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, in accordance with one or more embodiments, a monitoring criterion is obtained by a digital twin to monitor field well dynamics behavior of a well system of interest. For example, the digital twin manager may obtain a predetermined monitoring criterion defined by a user via a user interface. A monitoring criterion may be a time period, a specific well site, a specific data value range, or any other appropriate criterion for selecting data.

Based on the monitoring criterion, the digital twin obtains field well dynamics behavior data from the well system of interest. For example, the field well dynamics behavior data may include mass flow, pressure, and temperature for a well system of interest. As another example, the well dynamics behavior data may be similar to the well dynamics behavior data described above in FIG. 1 and the accompanying description. As another example, the digital twin manager may obtain the well dynamics behavior data from a database that stores six months of well dynamics behavior data which contain both normal operation conditions and shut-down conditions for the well system of interest. The digital twin manager may obtain well system abnormality data (i.e., abnormal operational data) which may include one or more value ranges of well dynamics behavior data when the well system is not under normal operations (e.g., corresponding to system faults, system failures, system shut-downs, safety conditions, weather conditions, well conditions, etc.). In one or more embodiments, field well dynamics behavior data, and well system abnormality data are obtained for one or more wells in accordance with one or more embodiments.

In Block 405, the digital twin obtains, based on the field well dynamics behavior data, emulated well dynamics behavior data using one or more physics-based models. Furthermore, the physics-based model may be similar to the physics-based model described below with respect to FIG. 5 and the accompanying description. In particular, a physics-based model server emulates the well dynamics behavior data below a predetermined frequency of the physics-based model based on one or more user selections defined by a user via a user interface. As another example, the user may modify the user selections for the physics-based model to adjust the emulated well dynamics behavior based on the predetermined monitoring criterion.

In Block 410, predicted well dynamics behavior data are obtained using a physics constrained ML model that is based on the emulated well dynamics behavior data from the physics-based model and the field well dynamics behavior data. In some embodiments, the digital twin manager trains one or more models using a physics constrained ML algorithm (e.g., an artificial neural network) to determine well dynamics behavior for a well system of interest. For example, the physics constrained ML model may be determined and validated using an artificial neural network (e.g., a Levenberg-Marquardt algorithm, a Naïve Bayes algorithm) in accordance with one or more embodiments. In one or more embodiments, the physics constrained ML model may be similar to the physics constrained ML model described above with respect to FIG. 2 and the accompanying description. As another example, the physics constrained ML model may be similar to the ML model described above with respect to FIG. 3 and the accompanying description.

In one or more embodiments, the digital twin manager applies the physics constrained ML model to predict the well dynamics behavior $y^{Mflow}(t)$, $y^{Pflow}(t)$, and $y^T(t)$ at time t based on the input well dynamics behavior data over a considered horizon d (e.g., a value of "10" seconds) (Equations 2, 3, and 4).

$$y^{Mflow}(t)=f^{Mflow}(x(t),x(t-1),\ldots,x(t-d)) \quad \text{Equation 2}$$

$$y^{Pflow}(t)=f^{Pflow}(x(t),x(t-1),\ldots,x(t-d)) \quad \text{Equation 3}$$

$$y^T(t)=f^T(x(t),x(t-1),\ldots,x(t-d)) \quad \text{Equation 4}$$

where $y^{Mflow}(t)$ is the predicted well mass flow at time t; $y^{Pflow}(t)$ is the predicted pressure at time t; $y^T(t)$ is the predicted temperature at time t; $f^{Mflow}$ is the function to predict well mass flow using input well dynamics behavior, $f^{Pflow}$ is the function to predict pressure using input well dynamics behavior, $f^T$ is the function to predict temperature using input well dynamics behavior, x(t) is a vector of input well dynamics behavior from the well system of interest and the physics-based model; and d is a considered horizon or time delay in seconds.

Furthermore, the digital twin manager may validate the physics constrained ML algorithm. For example, the digital twin manager may apply a nested k-fold inner/outer cross-validation to tune and validate the optimal parameters of the physics constrained ML model. As another example, the digital twin manager may validate the physics constrained ML model by using the well dynamics behavior prediction error (e.g., integral square error (ISE), mean error (ME), normalized ISE, normalized ME) between the predicted well dynamics behavior data based on a physics constrained ML model and the field well dynamics behavior for a well system of interest. ISE measures system performance by integrating the square of the difference between predicted well dynamics behavior determined by the model and the field well dynamics behavior data over a fixed interval of time (Equation 5). ME measures average system performance by averaging the integral of the absolute value of the difference between predicted well dynamics behavior determined by the model and the field well dynamics behavior data over a fixed interval of time (Equation 6). Normalized ISE measures the ISE value normalized by the final value of the ISE by the same physics-based model used by the digital twin of the well system (Equation 7). Normalized ME measures the ME value normalized by the final value of the ME by the same physics-based model used by the digital twin of the well system (Equation 8). For example, the physics constrained ML model is valid when the normalized ISE for the physics constrained ML model is less than a threshold (e.g., a value of "1"). As another example, the physics constrained ML model is valid when the normalized ME is less than a threshold (e.g., a value of "1").

$$ISE(t) = \int_{t1}^{t} (y(t) - d(t))^2 dt \quad \text{Equation 5}$$

$$ME = \frac{1}{t2 - t1} \int_{t1}^{t2} |y(t) - d(t)| dt \quad \text{Equation 6}$$

$$ISE^N(t) = \frac{(1)}{ISE_{ph-based}(t2))} \int_{t1}^{t} (y(t) - d(t))^2 dt \quad \text{Equation 7}$$

$$ME^N = \frac{(1)}{((t2 - t1)ME_{ph-based})} \int_{t1}^{t2} |y(t) - d(t)| dt \quad \text{Equation 8}$$

where y(t) is the predicted well dynamics behavior at time t by a physics constrained ML model; d(t) is the field well dynamics behavior at time t from a well system of interest; ISE(t) is the integral square error at time t; ME is the mean error from time t1 to t2; $ISE^N(t)$ is the integral square error at time t normalized by the final value $ISE_{ph-based}(t2)$ of the ISE by the same physics-based model used by the digital twin of the well system; $ME^N$ is the mean error normalized by the final value $ME_{ph-based}$ of the ME by the same physics-based model used by the digital twin of the well system.

In Block 415, one or more impact levels that associate the predicted well dynamics behavior data for a well system with a well system abnormality (e.g., one or more of the well system faults and failures included in the abnormal operational data) are determined using a second ML model (e.g., a distinct ML model that may be different than the physics constrained ML model). For example, the second ML model may be similar to the model (162) describes in FIG. 1 and the accompanying description. Likewise, the second ML model may be trained using a machine-learning algorithm based on a clustering algorithm, a principal component analysis (PCA) algorithm, or another type of machine-learning algorithm. As such, an impact level may differ between well systems for the well system abnormality based on the past facility monitoring maintenance and security protocols of the well system. In other words, for a specific well system, an attribute (e.g., well mass flow, pressure, temperature, etc.) with high impact level may not have high remediation urgency relative to another well system with a different structure, different operational history, and/or different maintenance record. Likewise, a high impact level may indicate a strong possibility of a particular well system abnormality.

In Block 420, one or more likelihood levels that associate the predicted well dynamics behavior data for a well system with a well system abnormality are determined using the second ML model. For example, a likelihood level may be a probability that a data value or pattern for particular attribute (e.g., mass flow, pressure, and/or temperature data) of the predicted well dynamics behavior data is going to be proceeded by the occurrence of a well system fault or failure. Similar to the impact levels, the likelihood levels may differ between well systems for the well system abnormality based on the past facility monitoring maintenance and security protocols of the well system. In other words, for a specific well system, an attribute with high likelihood level may not have high remediation urgency relative to another well system with a different structure, different operational history, and/or different maintenance record. Likewise, a high likelihood level may indicate a strong possibility of a particular well system abnormality.

In Block 425, a risk level and a probability of the well system abnormality is determined using the second ML model, based on the predicted well dynamics behavior data, and well system abnormality data. The second ML model may be trained by using a Naïve Bayes algorithm to determine the posterior probability (e.g., well system abnormality probabilities (171, 395)) from one or more data inputs (e.g., well system abnormality data (372), well mass flow data (373), well temperature data (374), and well pressure data (375)) in accordance with one or more embodiments. For example, the second ML model may be similar to the Naïve Bayes model described below with respect to FIG. 3 and the accompanying description. As such, well system abnormality probabilities (171) may be calculated based on the impact levels and likelihood levels for one or more predetermined attributes (e.g., mass flow, pressure, and temperature) of the predicted well dynamics behavior data. For example, a high impact level may indicate a high influence of a particular attribute of a well system to result in a well system abnormality when the attribute has a likelihood level beyond the predetermined normal range based on obtained well system abnormality data. As another example, a low impact level may indicate a low influence of a particular attribute of a well system to result in a well system abnormality when the attribute has a likelihood level beyond the predetermined normal range based on obtained well system abnormality data. The risk level may be determined based on a risk matrix that corresponds to the probability of the well system abnormality. For example, a risk level may be low when a probability of the well system abnormality is less than 0.1 and a risk level may be critical when a probability of the well system abnormality is greater than 0.75.

In Block 430, a command for a well operation may be determined based on the risk level and the probability of the well system abnormality in accordance with one or more embodiments. For example, a low impact level and a low likelihood level may indicate a low risk of a particular well system abnormality to a well system of interest. In other words, for a specific well system, a risk of well system abnormality with high likelihood and high impact level of a particular system abnormality may have high remediation urgency. In this instance, the digital twin manager may transmit one or more commands to network elements (e.g., a command for a particular well operation, valve operation, flow control, etc.) to modify a well system operation. Alternatively, a risk of well system abnormality with low likelihood and low impact level of a particular system abnormality may have low remediation urgency. Therefore, the command for a well operation may be for a continuation the previous operation without direct intervention/remediation. In one of more embodiments, the command may include a request for a revised monitoring criterion.

In Block 435, a command is transmitted to adjust various operations based on the impact level and the probabilities of well system faults and failures in accordance with one or more embodiments. For example, the digital twin manager may send a command to adjust the well mass flow of the well system of interest when the well system is determined to be in critical condition for well system faults and failures and the well mass flow has a high impact level and the probability of well system faults and failures.

Figure 5:
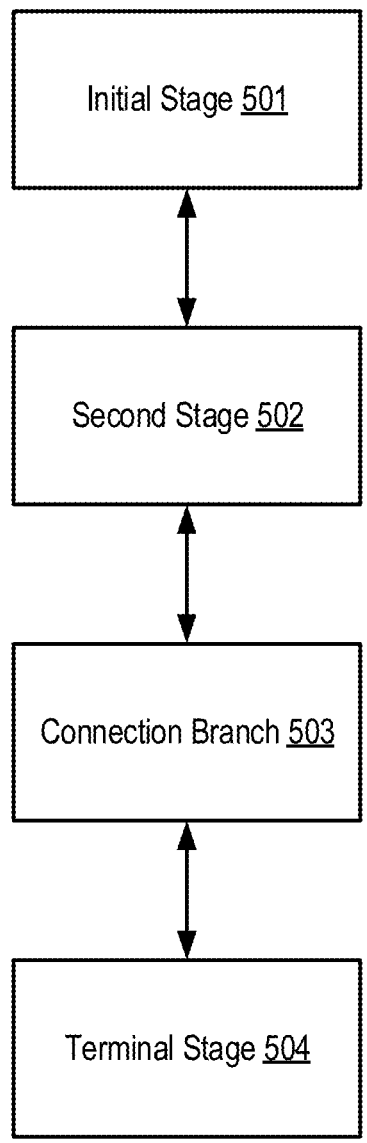
FIG. 5 shows an example in accordance with one or more embodiments.

FIG. 5 provides an example of a physics-based model in accordance with one or more embodiments. The following example is for explanatory purposes only and not intended to limit the scope of the disclosed technology. While the various blocks in FIG. 5 are presented and described sequentially, one of ordinary skill in the art will appreciate that some or all of the blocks may be organized in different orders, may be combined or omitted, and some or all of the blocks may be repeated in serial or parallel. Accordingly, the scope of the invention should not be limited by the specific arrangement as depicted in FIG. 5.

In FIG. 5, a physics-based model includes an initial stage (501), a second stage (502), a connection branch (503), and a terminal stage (504). Using the physics-based model, the digital twin manager determines an emulated dynamics behavior data (e.g., mass flow, pressure, and temperature) based on the underlying data inputs from the well measurements in a well subsystem. Each of these stages is described in further detail below.

In the physics-based model, the initial stage (501) includes a controlled reservoir module (i.e., a module emulating an infinite reservoir at a variable pressure and temperature). In some embodiments, the initial stage (501) further includes a reservoir flow restriction module (i.e., a module emulating a general pressure drop between the reservoir and the well subsystem). The initial stage (501) may include an input for the reservoir temperature from well data. The initial stage (501) may include various sensors (e.g., mass & energy flow rate sensor, pressure sensor, temperature sensor, etc.) to obtain various measurements (e.g., mass flow, energy flow, pressure, temperature, heat, and enthalpy, etc.) from a well subsystem to replicate the dynamics behavior from the reservoir in normal operating conditions for the well subsystem.

In the physics-based model, the second stage (502) is connected to the initial stage (501) to simulate components of a well subsystem between the reservoir and the output of the well subsystem. The second stage (502) may include a constant volume chamber (i.e., a module emulating the accumulation of mass and energy in a fixed volume) as a midstream chamber. In some embodiments, the second stage (502) further includes a midstream flow restriction module (i.e., a module emulating a general pressure drop within the well subsystem). The second stage (502) may include an input for one or more temperatures of components in the well subsystem from well data. The second stage (502) may include various sensors (e.g., mass & energy flow rate sensor, pressure sensor, temperature sensor, etc.) to obtain various measurements (e.g., mass flow, energy flow, pressure, temperature, heat, and enthalpy, etc.) from the well subsystem to replicate the dynamics behavior of the midstream chamber in normal operating conditions for the well subsystem.

In the physics-based model, the connection branch (503) is connected to the second stage (502) to simulate components of a well subsystem between the midstream chamber and the well head of the well subsystem. The connection branch (503) may include one or more well check valve modules that emulate valve and control mechanisms of the well subsystem (e.g., rotary valves, ball valves, linear globe valves, etc.). The connection branch (503) may include various sensors (e.g., mass & energy flow rate sensor, pressure sensor, temperature sensor, etc.) to obtain various measurements (e.g., mass flow, energy flow, pressure, temperature, heat, and enthalpy, etc.) from the well subsystem to replicate the dynamics behavior between the midstream chamber and well head in normal operating conditions for the well subsystem.

In the physics-based model, the terminal stage (504) is connected to the connection branch (503) to simulate the well head and output of the well subsystem. The terminal stage (504) may include a constant volume chamber (i.e., a module emulating the accumulation of mass and energy in a fixed volume) as the well head. In some embodiments, the terminal stage (504) may further include a well-sand GPU flow restriction module (i.e., a module emulating a general pressure drop between the well head and the output of the well subsystem). The terminal stage (504) may include various sensors (e.g., mass & energy flow rate sensor, pressure sensor, temperature sensor, etc.) to obtain various measurements (e.g., mass flow, energy flow, pressure, temperature, heat, and enthalpy, etc.) from the well subsystem to replicate the dynamics behavior at the well head and the well subsystem output in normal operating conditions.

Furthermore, additional modules such as additional valves and thermal resistances may be included throughout the various sections of the physics-based model to replicate the effects of other well equipment and to simulate heat flow through the well subsystem.

Figure 6A:
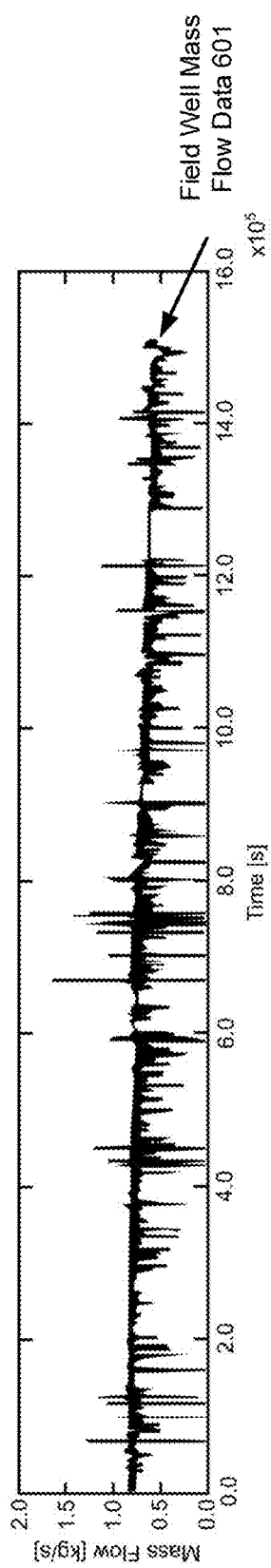
FIGS. 6A, 6B, and 6C show examples in accordance with one or more embodiments.
Figure 6B:
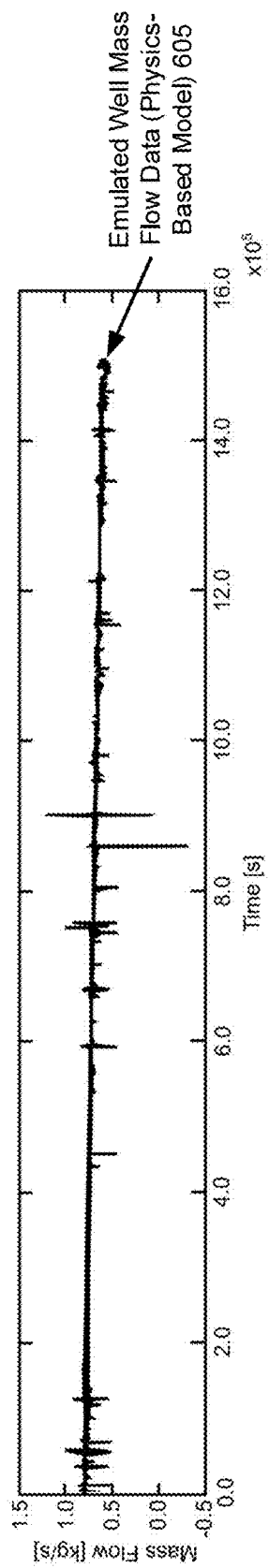
Figure 6C:
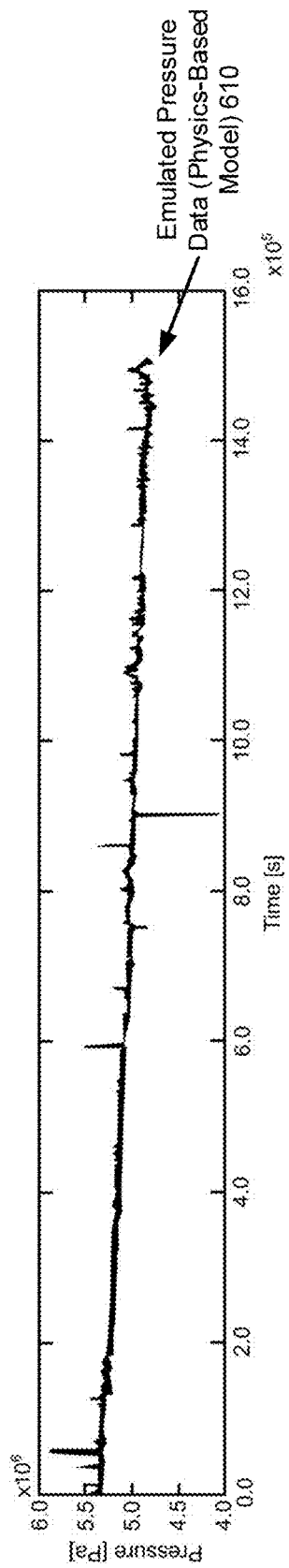

FIG. 6A shows an example of field well mass flow data (601) (i.e., field well dynamics behavior data). FIG. 6B shows an example of emulated well mass flow data (605) determined based on a physics-based model (i.e., emulated well dynamics behavior data). FIG. 6C shows an example of emulated well pressure data (610) determined based on a physics-based model (i.e., another emulated well dynamics behavior data).

Figure 7:
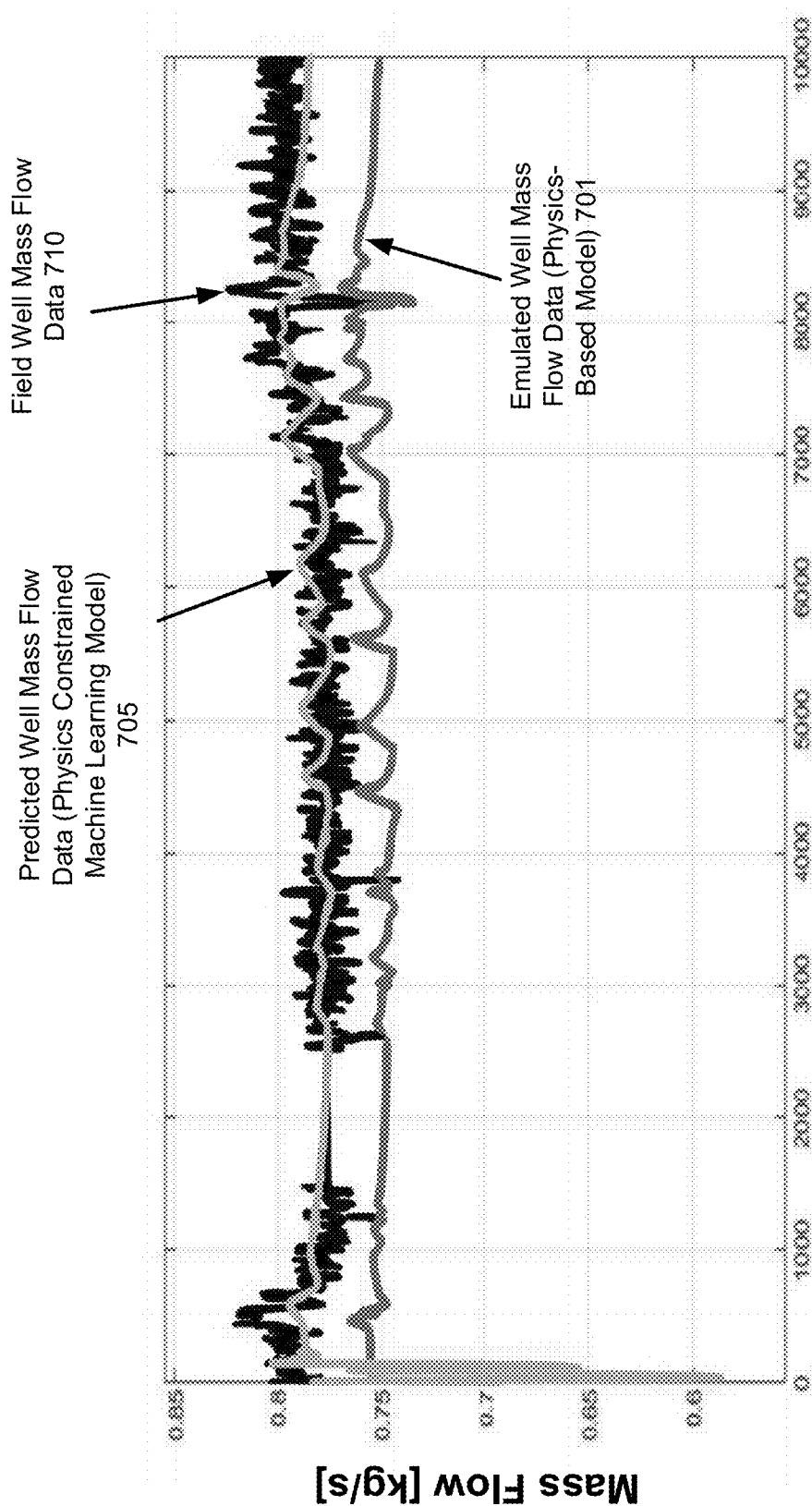
FIG. 7 shows an example in accordance with one or more embodiments.

FIG. 7 shows a emulated well mass flow data (701) determined based on a physics-based model (i.e., emulated well dynamics behavior data), a predicted well mass flow data (705) determined by a physics constrained ML model (i.e., predicted well dynamics behavior data), and field well mass flow data (710) (i.e., filed well dynamics behavior data). The emulated well mass flow data (701) may match components in the field well mass flow data (710). On the other hand, the predicted well mass flow data (705) obtained by using an artificial neural network, a Levenberg-Marquardt algorithm, and the physics-based model may emulate the high resolution behavior of field well mass flow data (710). For example, the coupling of the field well mass flow data (710) and the emulated well mass flow data (701) as inputs to the physics constrained ML model may replicate the noise and/or disturbances related to nonlinear dynamics of the well system of interest. The good match between the predicted well mass flow data (705) determined by a physics constrained ML model and field well mass flow data (710) also shows the physics constrained ML model is a valid generalized model.

Figure 8:
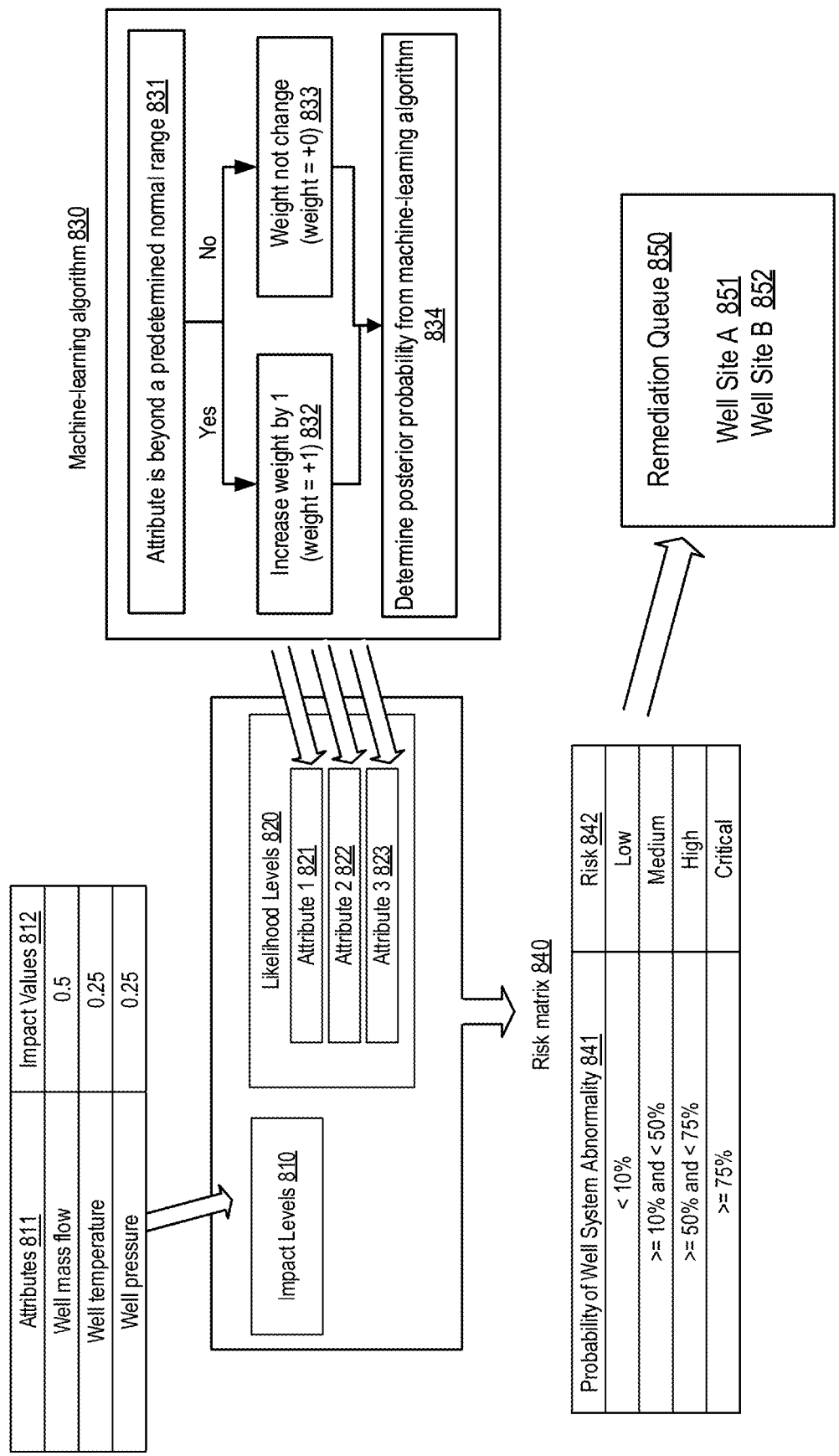
FIG. 8 show an example in accordance with one or more embodiments.

FIG. 8 provides an example of generating a remediation queue based on impact levels (810) and likelihood levels (820) for early detection of a well system abnormality. Impact levels (810) may be one or more impact values (812) determined by the percentage contributions of one or more attributes (811) (e.g., mass flow, temperature, and pressure) to calculate the amount of risk of a well system abnormality. For example, the impact value $w_{mf}$ of well mass flow is assigned a value of "0.5," the impact value of well pressure $w_p$ is assigned a value of "0.25," and the impact value of well temperature $w_t$ is assigned a value of "0.25." Each impact value (812) may be adjusted depending on analysis of identified well system abnormalities from prior experience or from the abnormal operation data. Likewise, impact levels (810) may be normalized for all attributes (811).

As shown as FIG. 8, a digital twin manager determines various probabilities of a well system abnormality (e.g., likelihood values (820)) using a machine-learning algorithm (830) (e.g., the second ML model that may be distinct from the physics constrained ML model). An example of determining a likelihood level (820) includes three iterations (i.e., likelihood values) with attributes from a predetermined list (i.e., attribute 1 (821), attribute 2 (822), attribute 3 (823)). The likelihood value p of an attribute may be determined based on the characteristics of a vulnerability related to the attribute. For example, the likelihood value $p_{mf}$ of well mass flow is assigned a value of "1.0" when predicted well mass flow is beyond a predetermined normal range. As another example, the likelihood value $p_{mf}$ of well mass flow is assigned a value of "0.0" when predicted well mass flow is within a predetermined normal range.

As shown as FIG. 8, a ML algorithm (830) may be applied to the predetermined attribute list in a sequential order according to one or more embodiments. Likewise, the ML algorithm (830) may be a Naïve Bayes algorithm or another type of ML algorithm. The ML algorithm (830) may determine a weight change (832, 833) based on the given attribute (831) associated with well system abnormality. The ML algorithm may determine posterior probability (834) for the given attribute (831) which may be input for another iteration of the ML algorithm with another given attribute (e.g., summing the likelihood values or sequentially summing the likelihood values). According to one or more embodiments, a likelihood level (820) may be determined from the final posterior probability (834) from ML algorithm (830) based on the predetermined attributes. While the various blocks (820) in FIG. 8 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

As shown as FIG. 8, a risk matrix (840) may be obtained from impact levels (810) and likelihood levels (820) according to one or more embodiments. In the risk matrix (840), a probability of a well system abnormality (841) and a risk level (842) may be determined based on the likelihood levels (820) and the impact levels (810) for the predetermined attributes (Equation 9). For example, a risk level may be low when a probability of well system faults and failures is less than 0.1. As another example, a risk level may be critical when a probability of well system faults and failures is greater than 0.75. Likewise, a risk level (e.g., low, medium, high, critical) (842) may be assigned by the digital twin manager for probability of well system abnormality in the risk matrix (840). In particular, the digital twin manager may submit remediation queue (850) to various well system components (e.g., well site A (851), well site B (852)) for adjusting a well system operation when the risk level is above a predetermined threshold (e.g., critical risk level attributes are addressed with priority). The risk matrix (840) may provide proactive intelligence and information for early detection to implement proactive analysis of identified well system faults and failures.

$$P_{risk} = \frac{p_{mf}w_{mf} + p_p w_p + p_t w_t}{w_{mf} + w_p + w_t} \qquad \text{Equation 9}$$

where $P_{risk}$ is the predicted risk of a well system abnormality, $w_{mf}$ is the impact value of well mass flow, $w_p$ is the impact value of well pressure, $w_t$ is the impact value of well temperature, $p_{mf}$ is the likelihood value of well mass flow, $p_p$ is the likelihood value of well pressure, $p_t$ is the likelihood value of well temperature.

Figure 9:
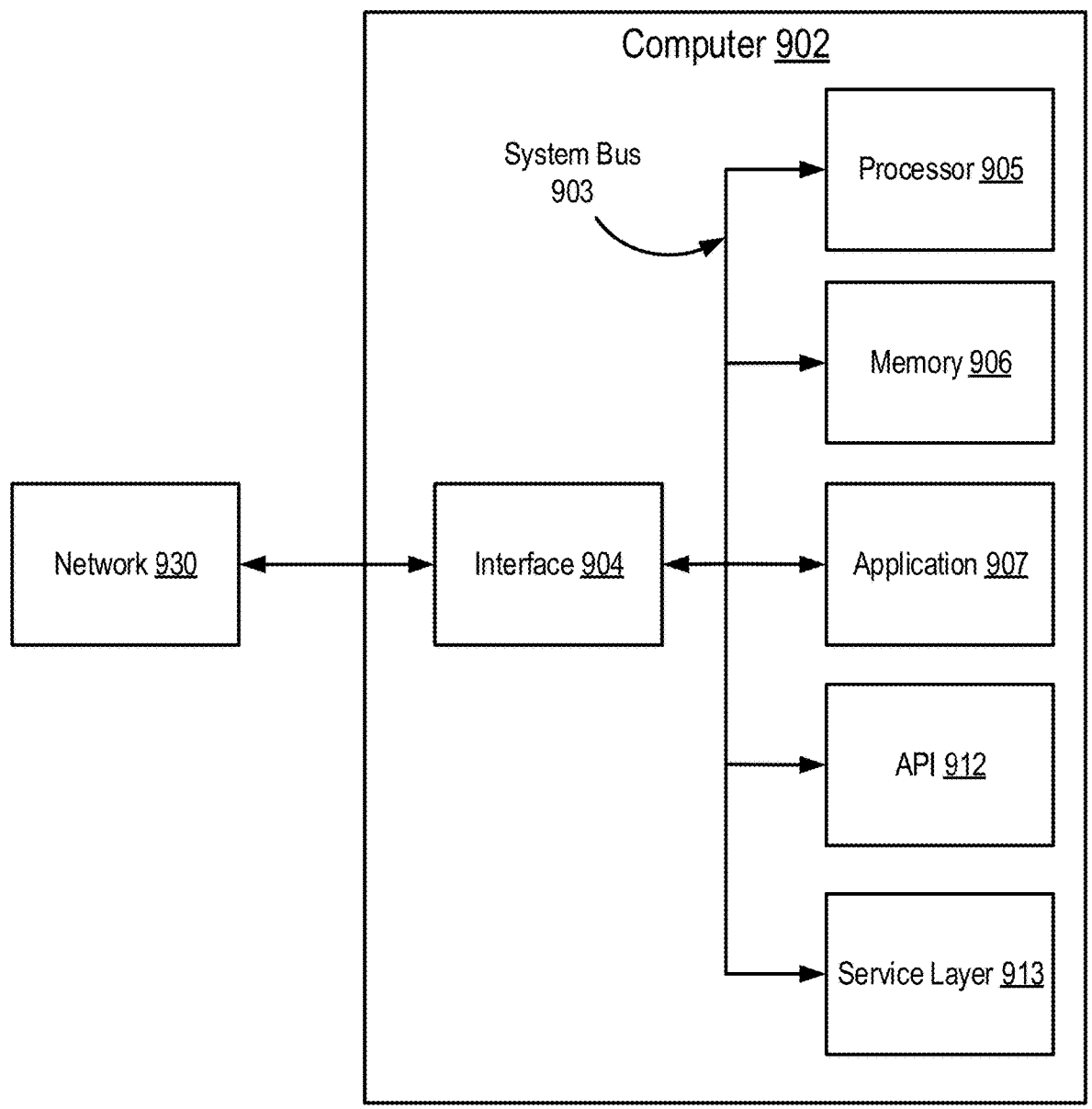
FIG. 9 shows a computer system in accordance with one or more embodiments.

FIG. 9 is a block diagram of a computer system (902) used to provide computational functionalities associated with described algorithms, methods, functions, processes, flows, and procedures according to one or more embodiments. The illustrated computer (902) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include an input device, such as a keypad, keyboard, touch screen, or other device that can accept user information, and an output device that conveys information associated with the operation of the computer (902), including digital data, visual information, audio information, a graphical user interface (GUI), or any combination thereof.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, other environments, or any combination of environments.

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other and/or the interface (904) over the system bus (903) using an application programming interface (API) (912) or a service layer (913), or any combination thereof. The API (912) may include specifications for routines, data structures, and object classes. The API (912) may be either computer-language independent or dependent and refer to a complete interface, a single function, or even a set of APIs. The service layer (913) provides software services to the computer (902) or other components that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or any other suitable language providing data in extensible markup language (XML) format or any other suitable format. While illustrated as an integrated component of the computer (902), alternative implementations may illustrate the API (912) or the service layer (913) as stand-alone components in relation to other components of the computer (902) or other components of the network (930) that that are communicably coupled to the computer (902). Moreover, any or all parts of the API (912) or the service layer (913) may be implemented as child or sub-modules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software, hardware, or any combination thereof and is operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes at least one computer processor (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single module, the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing computer (902), each computer (902) communicating over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

In some embodiments, the computer (902) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A method of managing a well system, comprising:
obtaining, by a digital twin manager and based on field well dynamics behavior data of a well site of the well system, emulated well dynamics behavior data using a physics-based model,
wherein the physics-based model includes a valve module that corresponds to and emulates a valve control mechanism of the well site, and
wherein the field well dynamics behavior data include:
normal operational data; and
abnormal operational data corresponding to at least one of system faults, system failures, system shutdowns, safety conditions, weather conditions, and abnormal well conditions;
obtaining, by the digital twin manager and based on a predetermined monitoring criterion, predicted well dynamics behavior data of the well site using a physics constrained machine learning model that is based on the emulated well dynamics behavior data and the field well dynamics behavior data;
determining, by the digital twin manager and using a second machine learning model, an impact level that associates the predicted well dynamics behavior data with a well system abnormality in which a well mass flow of the well site is beyond a predetermined range,
wherein the second machine learning model includes a Naïve Bayes algorithm that uses the predicted well dynamics behavior data and the abnormal operational data as inputs to a learned Naïve Bayes model,
wherein the learned Naïve Bayes model comprises attributes, class probabilities, and conditional probabilities based on the predicted well dynamics behavior data and the abnormal operational data,
wherein the attributes comprise an ordered list of a well mass flow attribute, a well temperature attribute, and a well pressure attribute,
wherein the determining of the impact level includes, for each attribute, determining a corresponding normalized impact value that is a percentage contribution of the predicted well dynamics behavior data, and
wherein the normalized impact values are based on the abnormal operational data;
determining, by the digital twin manager and using the second machine learning model, a likelihood level that associates the predicted well dynamics behavior data with the well system abnormality,
wherein the determining of the likelihood level includes determining likelihood values that correspond to the normalized impact values, and
wherein the likelihood values are scaled based on the percentage contributions of the corresponding normalized impact values;
determining, by the digital twin manager and using the second machine learning model, a probability and a risk level of the well system abnormality based on the impact level and the likelihood level,
wherein determining the probability of the well system abnormality includes summing the likelihood values;
determining, by the digital twin manager, a command for adjusting the valve control mechanism based on the risk level and the probability of the well system abnormality; and
based on the command, opening or closing the valve control mechanism to regulate the well mass flow of the well site to remediate the well system abnormality and restore the well mass flow of the well site to the predetermined range,
wherein the second machine learning model is configured to determine, for each attribute in the ordered list, a posterior probability that is input for a next iteration of the second machine learning model for the next attribute of the ordered list.

2. The method of claim 1,
wherein the field well dynamics behavior data include well mass flow, well pressure, and well temperature performance of a well of interest in the well system.

3. The method of claim 1,
wherein the physics constrained machine learning model is trained based on at least six months of the field well dynamics behavior data.

4. The method of claim 1,
wherein the physics constrained machine learning model is obtained using a machine learning algorithm selected from a group consisting of is a Levenberg-Marquardt algorithm, a Gauss-Newton algorithm, a steepest descent algorithm, and an artificial neural network.

5. The method of claim 1,
wherein the command includes a request for a revised monitoring criterion.

6. The method of claim 5,
wherein the revised monitoring criterion is a new data value range for the well mass flow of the well system.

7. A well system, comprising:
a well site;
a physics-based modeling server that outputs emulated well dynamics behavior data for the well site based on a physics-based model and field well dynamics behavior data of the well site,
wherein the physics-based model includes a valve module that corresponds to and emulates a valve control mechanism of the well site, and
wherein the field well dynamics behavior data include:
normal operational data; and
abnormal operational data corresponding to at least one of system faults, system failures, system shutdowns, safety conditions, weather conditions, and abnormal well conditions; and
a digital twin manager, coupled to the physics-based modeling server and the well site, that includes a processor,
wherein the digital twin manager:
obtains, based on a predetermined monitoring criterion, predicted well dynamics behavior data of the well site using a physics constrained machine learning model that is based on the emulated well dynamics behavior data and the field well dynamics behavior data;
determines, by using a second machine learning model, an impact level that associates the predicted well dynamics behavior data with a well system abnormality in which a well mass flow of the well site is beyond a predetermined range,
wherein the second machine learning model includes a Naïve Bayes algorithm that uses the predicted well dynamics behavior data and the abnormal operational data as inputs to a learned Naïve Bayes model,
wherein the learned Naïve Bayes model comprises attributes, class probabilities, and conditional probabilities based on the predicted well dynamics behavior data and the abnormal operational data,
wherein the attributes comprise an ordered list of a well mass flow attribute, a well temperature attribute, and a well pressure attribute,
wherein the impact level includes normalized impact values that are percentage contributions of the predicted well dynamics behavior data, and
wherein the normalized impact values are based on the abnormal operational data;
determines, by using the second machine learning model, a likelihood level that associates the predicted well dynamics behavior data with the well system abnormality,
wherein the likelihood level includes likelihood values that correspond to the normalized impact values, and
wherein the likelihood values are scaled based on the percentage contributions of the corresponding normalized impact values;

determines, by using the second machine learning model, a probability and a risk level of the well system abnormality based on the impact level and the likelihood level,
 wherein determining the probability of the well system abnormality includes summing the likelihood values;
determines a command for adjusting the valve control mechanism based on the risk level and the probability of the well system abnormality; and
based on the command, opens or closes the valve control mechanism to regulate the well mass flow of the well site to remediate the well system abnormality and restore the well mass flow to the predetermined range,
wherein the second machine learning model is configured to determine, for each attribute in the ordered list, a posterior probability that is input for a next iteration of the second machine learning model for the next attribute of the ordered list.

8. The well system of claim 7, wherein the field well dynamics behavior data include well mass flow, well pressure, and well temperature performance of the well site.

9. The well system of claim 7, wherein the physics constrained machine learning model is trained based on at least six months of the field well dynamics behavior data.

10. The well system of claim 7: wherein the physics constrained machine learning model is obtained using a machine learning algorithm selected from a group consisting of is a Levenberg-Marquardt algorithm, a Gauss-Newton algorithm, a steepest descent algorithm, and an artificial neural network.

11. A non-transitory computer readable medium storing instructions executable by a computer processor, the instructions comprising functionality for:
 obtaining, based on field well dynamics behavior data of a well site of a well system, emulated well dynamics behavior data using a physics-based model,
  wherein the physics-based model includes a valve module that corresponds to and emulates a valve control mechanism of the well site, and
  wherein the field well dynamics behavior data include:
   normal operational data; and
   abnormal operational data corresponding to at least one of system faults, system failures, system shutdowns, safety conditions, weather conditions, and abnormal well conditions;
 obtaining, based on a predetermined monitoring criterion, predicted well dynamics behavior data of the well site using a physics constrained machine learning model that is based on the emulated well dynamics behavior data determined and the field well dynamics behavior data;
determining, by using a second machine learning model, an impact level that associates the predicted well dynamics behavior data with a well system abnormality in which a well mass flow of the well site is beyond a predetermined range,
 wherein the second machine learning model includes a Naïve Bayes algorithm that uses the predicted well dynamics behavior data and the abnormal operational data as inputs to a learned Naïve Bayes model,
 wherein the learned Naïve Bayes model comprises attributes, class probabilities, and conditional probabilities based on the predicted well dynamics behavior data and the abnormal operational data,
 wherein the attributes comprise an ordered list of a well mass flow attribute, a well temperature attribute, and a well pressure attribute,
 wherein the determining of the impact level includes determining normalized impact values that are percentage contributions of the predicted well dynamics behavior data, and
 wherein the normalized impact values are based on the abnormal operational data;
determining, by using the second machine learning model, a likelihood level that associates the predicted well dynamics behavior data with the well system abnormality,
 wherein the likelihood level includes likelihood values that correspond to the normalized impact values, and
 wherein the likelihood values are scaled based on the percentage contributions of the corresponding normalized impact values;
determining, by using the second machine learning model, a probability and a risk level of the well system abnormality based on the impact level and the likelihood level,
 wherein the probability of the well system abnormality includes a sum of the likelihood values;
determining a command for adjusting the valve control mechanism based on the risk level and the probability of the well system abnormality; and
based on the command, opening or closing the valve control mechanism to regulate the well mass flow of the well site to remediate the well system abnormality and restore the well mass flow to the predetermined range,
wherein the second machine learning model is configured to determine, for each attribute in the ordered list, a posterior probability that is input into a next iteration of the second machine learning model for the next attribute of the ordered list.

* * * * *